No. 725,074. PATENTED APR. 14, 1903.
M. G. GRAHAM.
CULTIVATOR.
APPLICATION FILED MAR. 15, 1902.
NO MODEL. 4 SHEETS—SHEET 4.
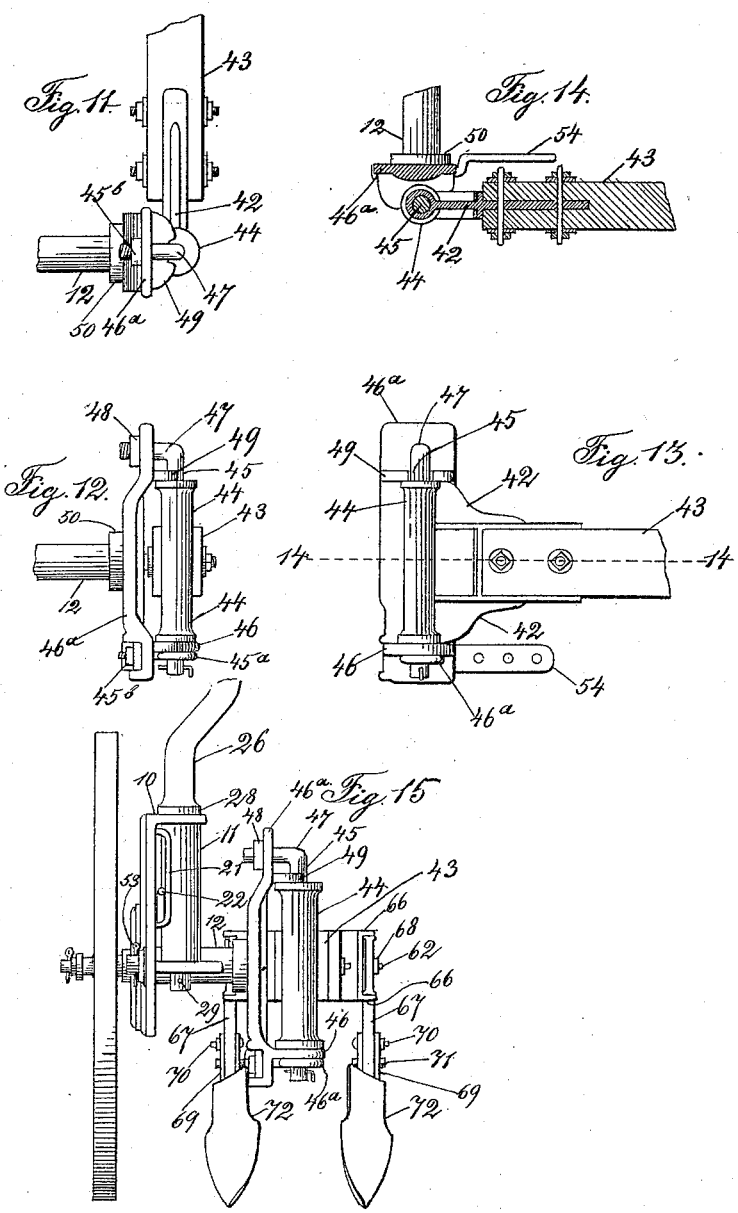

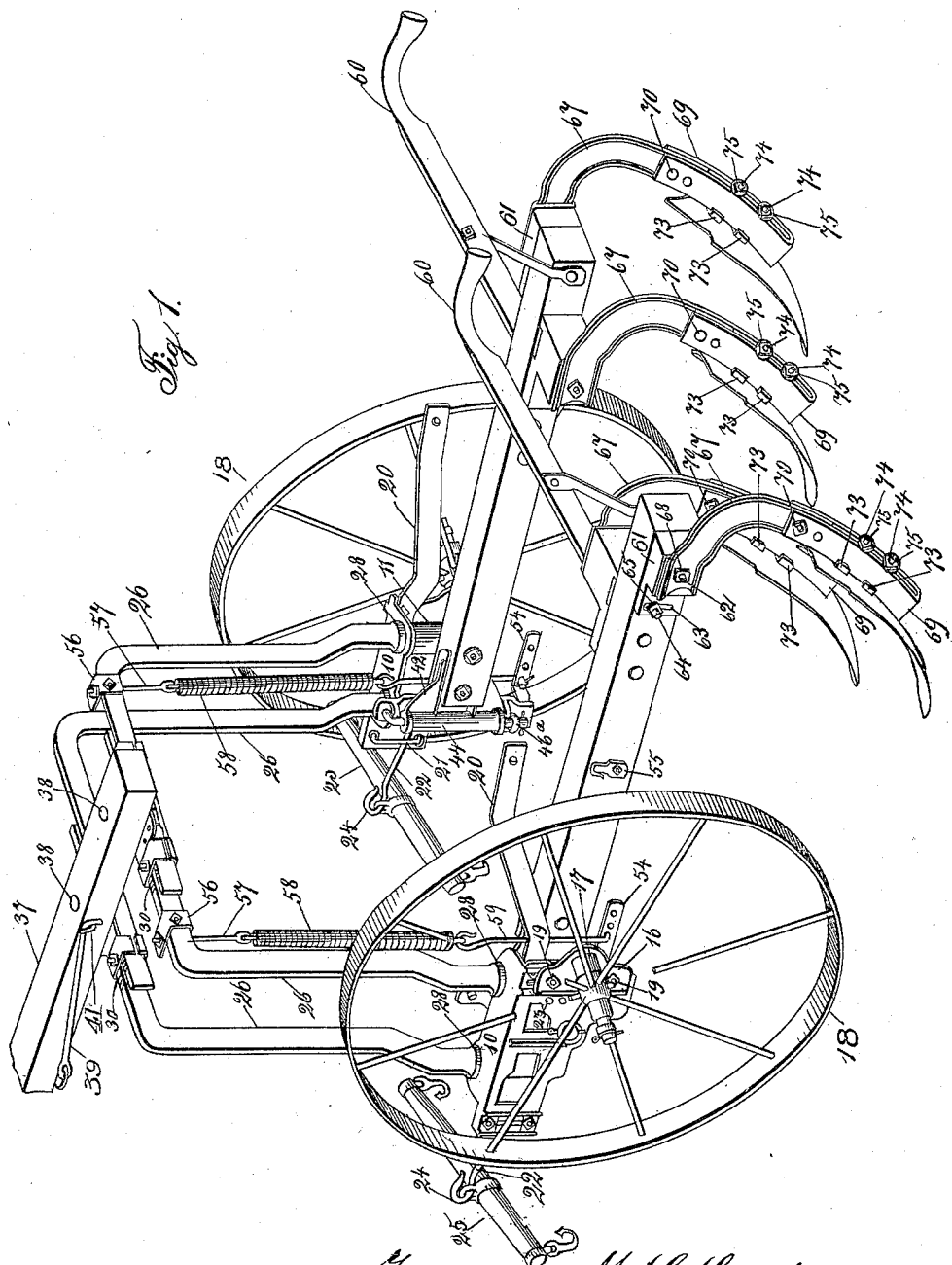

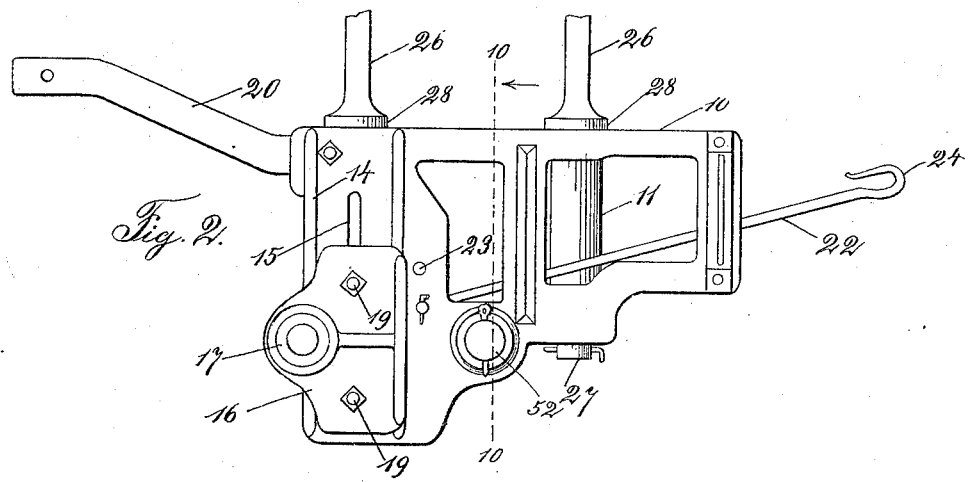
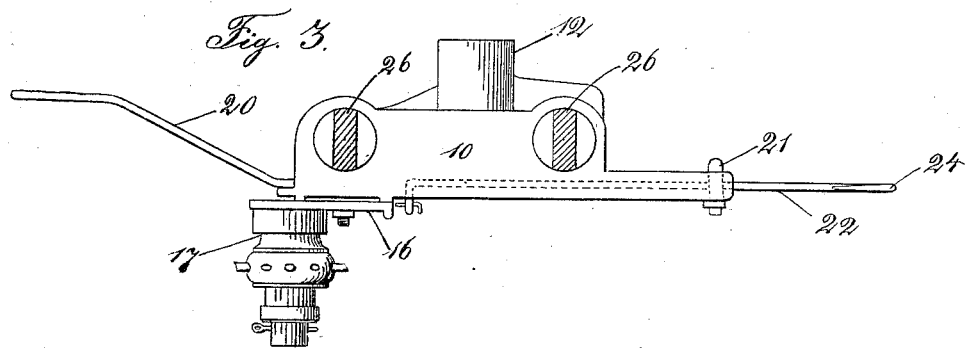
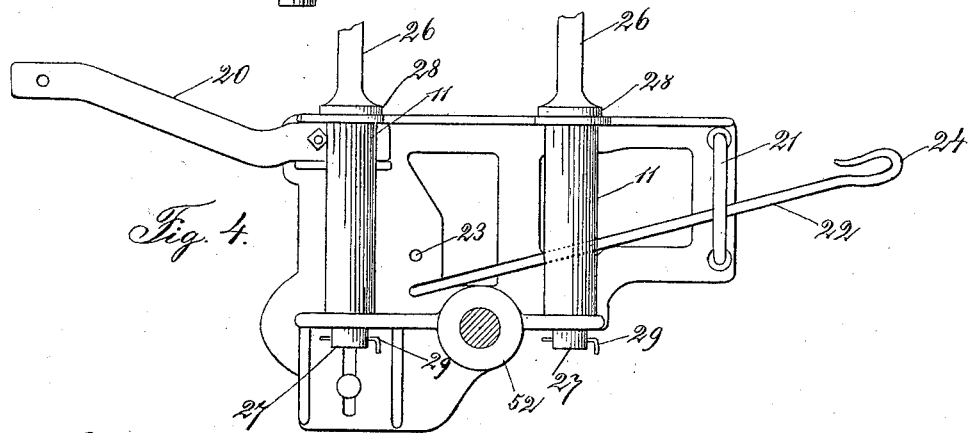

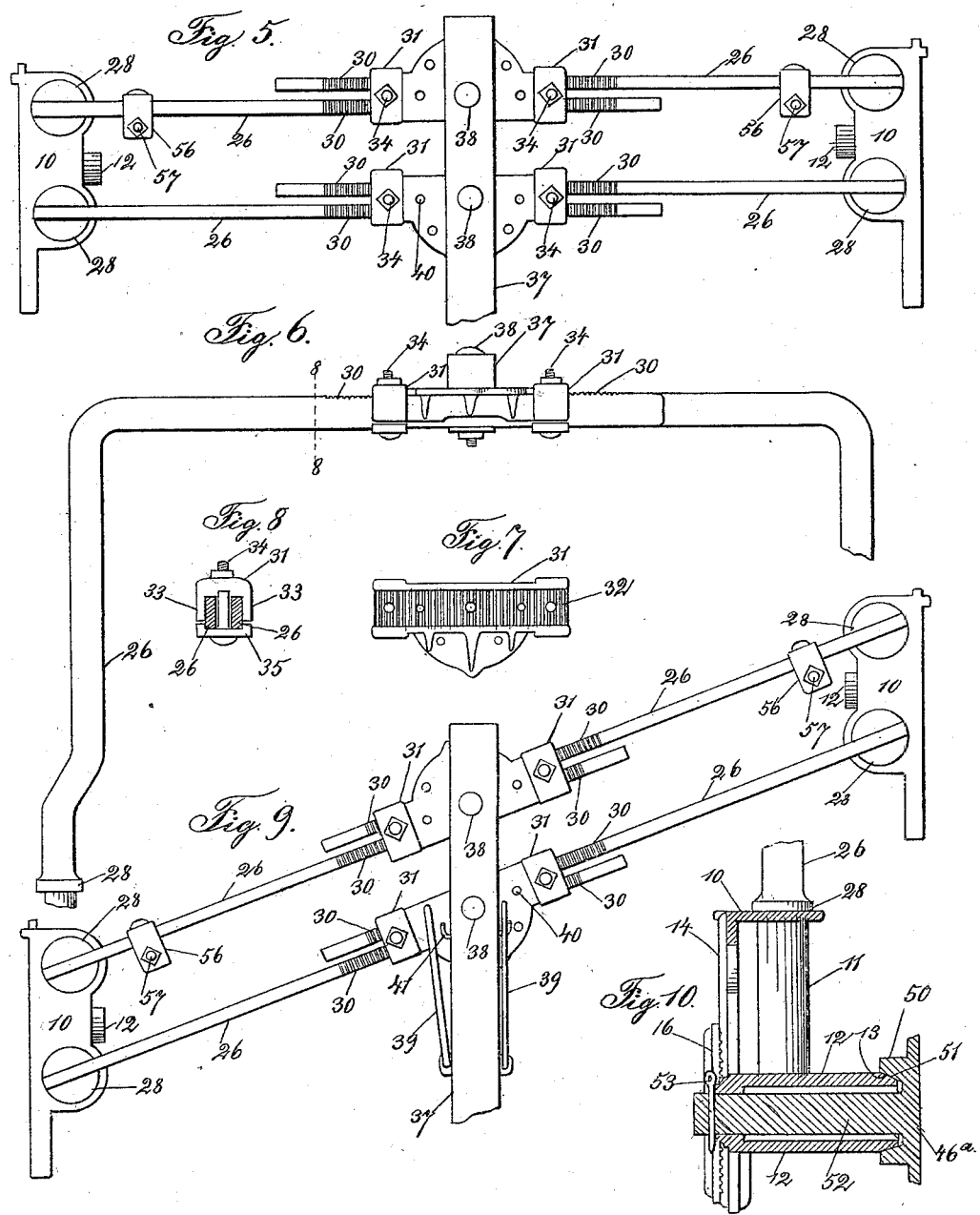

UNITED STATES PATENT OFFICE.

MUCKERSIE G. GRAHAM, OF DES MOINES, IOWA, ASSIGNOR OF ONE-HALF TO W. M. BLACK, OF DES MOINES, IOWA.

CULTIVATOR.

SPECIFICATION forming part of Letters Patent No. 725,074, dated April 14, 1903.

Application filed March 15, 1902. Serial No. 98,347. (No model.)

*To all whom it may concern:*

Be it known that I, MUCKERSIE G. GRAHAM, a citizen of the United States, residing at Des Moines, in the county of Polk and State of Iowa, have invented certain new and useful Improvements in Cultivators, of which the following is a specification.

This invention relates to that class of cultivators in which the draft-animals are attached to the machine-frame independently and the wheels and tongue are maintained in parallelism with the line of travel even though one side of the machine is in advance of the other.

My objects are first to provide a cultivator of this class with two independent frame-sections, each of which supports a singletree and a wheel and which are connected with each other and with a tongue by means of two arches, which serve to hold the wheel and tongue parallel with the line of advance and to connect the cultivator-beams direct to these frame-sections and not to the arches, so that the strain upon the shovels is not borne by the arches, but is thrown directly upon the frame-sections to which the draft-animals are attached.

The objects of my invention are, further, to provide a machine of this class, of simple, durable, and inexpensive construction, in which the frame-members may be cast complete in one piece; to provide arches capable of adjustment, so that the frame members may be fixed at any desirable distance relative to each other; to provide means whereby the frame members and tongue will always be parallel, although one frame member may be a considerable distance in advance of the other; to provide improved means for connecting the parts of the arches with each other and with the tongue; to provide a cultivator in which the cultivator-beams are connected with the frame members a considerable distance in advance of the point of attachment of the machine-wheels with the frame member, whereby the striking of an obstruction by the cultivator-shovels will not cause the machine to tilt nor the tongue to swing to any objectionable extent; to provide improved means for counterbalancing the weight of the cultivator-beams; to provide improved and simplified means for connecting the cultivator-beams with the machine-frame members, whereby vertical and lateral movement of the cultivator-beams is permitted; to provide improved and simplified means for connecting the shovel-bearing arms with the beams, and to provide simple and inexpensive means for adjustably connecting the shovel-bearing arms.

My invention consists in certain details in the construction, arrangement, and combination of the various parts of the device whereby the objects contemplated are attained, as hereinafter more fully set forth, pointed out in my claims, and illustrated in the accompanying drawings, in which—

Figure 1 shows in perspective the complete cultivator. Fig. 2 shows an outside elevation of one of the frame members. Fig. 3 shows a top or plan view of same. Fig. 4 shows an inside elevation of same. Fig. 5 shows a top or plan view of the arches by which the frame members are connected with the tongue. Fig. 6 is a front elevation of same, part of one side being broken away. Fig. 7 shows an inverted plan view of the plate for connecting the opposite parts of one of the arches together and connecting them with the tongue. Fig. 8 shows a detail sectional view through the line 8 8 of Fig. 6. Fig. 9 shows a top or plan view of the parts illustrated in Fig. 5 with one of the frame members at its limit of movement in advance of the other. Fig. 10 shows an enlarged detail vertical sectional view illustrating the means for connecting the cultivator-beam journals with the frame members. Fig. 11 shows a top or plan view illustrating the universal joint for connecting the cultivator-beams with the frame members. Fig. 12 shows a front elevation of same. Fig. 13 shows a side elevation of same. Fig. 14 shows a sectional view of same through the indicated line 14 14 of Fig. 13, and Fig. 15 shows a front elevation of one of the frame members with a wheel attached thereto and the cultivator-beam with shovels connected therewith.

At the opposite side of the machine-frame are two similar parts, each of which may be cast complete in one piece and which I term the "frame members," only one of which will be herein particularly described. The body portion of this frame member is indicated by the reference-numeral 10. On the inner surface thereof are two vertically-arranged tubular portions 11, one being a considerable distance in advance of the other. At the lower portion and near the longitudinal center of the frame member, at its inner side, is a tubular extension 12, the outer end of which is beveled at 13 for purposes hereinafter made clear, and near its outer end is an opening smaller in diameter than the diameter of the interior of the extension. At the rear end portion of the frame member and on its outer face are two vertical ribs 14, and a vertical slot 15 is formed between these ribs.

The numeral 16 indicates a plate, having grooves on its inner face to receive the ribs 14. Projecting outwardly from said plate 16 is a wheel-axle 17, on which one of the machine-supporting wheels 18 is mounted. This plate 16 is adjustably connected with the frame member by means of the bolts 19 passing through the plate 16 and through the slot 15, and the said plate is some distance in the rear of the tubular extension 12. Fixed to the frame member on its upper corner is an arm 20 to project upwardly and rearwardly for purposes hereinafter made clear. Fixed to the forward inner face of the frame member is a loop 21, and the numeral 22 indicates a rod the rear end of which is adjustably connected with the holes 23 in the frame member and the body portion of which projects through between the loop 21 and the frame member, and at the front end of the rod 22 is a hook 24, to which a singletree 25 may be attached.

I shall next describe the arches by which the frame members are connected, and it will be noted that there are two independent arches of similar construction. Hence only one will be now specifically described. These arches are each made up of two members the meeting ends of which are made adjustable relative to each other, so that the frame members may be set to any desirable distance relative to each other. The reference-numeral 26 indicates one of the arch members, having at its lower end a journal 27, designed to enter the tubular extension 11 of the frame 10. A flange 28 at the top of the journal 27 limits its movement downwardly relative to the frame 10, and a pin 29 is passed through an opening in the lower end of the journal 27 to prevent upward movement relative to the frame 10. The top portion of the part 26 is horizontal and extends a considerable distance past the transverse center of the machine and is notched at its top edge at 30. I connect the two overlapping ends of these arch members, so that they are adjustable and yet firm enough to withstand all strains put upon them, as follows: The numeral 31 indicates a plate notched on its under surface at 32, which notches are designed to coact with the notches 30 on top of the arch members. At the front and rear edges of the plate are the downwardly-projecting flanges 33. This plate is placed on top of the overlapping portions of the arch members, and the bolts 34 are passed through the plate and between the arch members, and they enter the two small plates 35 beneath the arch members, and obviously when the nuts 36 of these bolts are screwed tight the plates 35 and 31 will be firmly clamped together, securing the arch members between them, and the bolts 34 will prevent lateral movements of the arch members relative to each other. Obviously by loosening the nuts 36 the arch members may move relative to each other to thereby increase or diminish the distance between the frame members. As before stated, there are two arches, and each of course is provided with a similar connecting device. The numeral 37 indicates the machine-tongue pivoted by means of the bolts 38 with each arch, said bolts passing through the plate 31. We have now two frame members and the tongue, all pivotally connected with each other by means of the parallel arches, and obviously one of said frame members may be placed in a position considerably in advance of the other, and when in any position the tongue must remain parallel with the frame members. In some instances it may be desirable to fix the parts so that the arch cannot move relative to the tongue, and to provide for this I employ two rods 39, pivoted to the tongue, to enter openings 40 in the forward one of the plates 31. When these rods 39 are not in use, they are supported on the hooks 41 on the tongue.

There are also two entirely-independent cultivator-beams, which must move on universal joints relative to the frame members to connect the beam with the frame member. I employ a bracket having at its rear end an extension 42, to which the beam 43 is bolted. On one side of the bracket is an upright tubular extension 44, and a bolt 45 passes through this tubular extension 44. The lower end of this bolt passes downwardly through a perforated lug 46 on the plate $46^a$. I have provided means for preventing this lower end from working loose, as follows: $45^a$ indicates a bolt having a loop at its outer end to encircle the bolt 45, and said bolt is passed through the plate $46^a$ and a nut $45^b$ is placed on its inner end, so that the bolt 45 may be firmly held toward the plate $46^a$, and its upper end is bent inwardly at right angles at 47 and passes through an opening in the bracket, and a nut 48 is placed on the upper end of the rod and against the inner face of the bracket. Formed on or fixed to the outer face of the plate $46^a$ is a notched lug 49 to receive the upper end portion of the bolt 45. Obviously by tightening the nut $45^b$ any wear that occurs between the bolt 45 and the lug 49 will be taken up and rattling prevented. This mechanism illustrates the means whereby the cultivator-beam is attached to the plate $46^a$ and movement of the cultivator-beam in a horizontal plane is permitted.

Obviously the lugs 46 and 49 by engaging the ends of the tubular extension 44 prevent its vertical movement relative to the plate 46ª. Formed on the outer face of the plate 46ª is an annular rim 50, having its inner face beveled at 51, said beveled edge being designed to set against the beveled edge 13, before described. Arranged concentrically within the annular rim 50 is a journal 52, which is smaller in diameter than the interior of the extension 12, before described, and it is of a length to pass completely through the extension 12 and the frame member 10, and a pin 53 passes through its end on the outer surface of the frame member 10. By this means a bearing is provided for the journal 52 at each end, and the journal need only be finished at its outer end, where it passes through the opening in the part 10, and the beveled edge 51 is all that need be finished of the annular rim 50. This provides means whereby the cultivator-beam may freely move in a vertical plane and, together with the parts just above described, a universal movement is permitted to the cultivator-beams. I have formed on the plate 46 an arm 54 for purposes hereinafter made clear.

I have attached to each cultivator-beam a hook 55, designed to engage the arm 20, whereby the cultivator-beam may be supported in an elevated position. I have also provided means whereby the weight of the cultivator-beams is counterbalanced, so that the operator may easily control the movements of the cultivator-beams without the necessity of lifting much weight, as follows: The numeral 56 indicates a strap bolted to one side of the arch. Connected with the strap 56 is a rod 57, which rod is attached to a contractile spring 58, the lower end of which is hooked to a rod 59, which rod is adjustably connected with the arm 54. This spring is of such resiliency that it will substantially bear the weight of the cultivator-beam and attached parts, and obviously by adjusting the rod 59 relative to the arm 54 the spring may be made to balance. A similar spring and connected parts are provided for each cultivator-beam.

In cultivators of this class it is to be remembered that the drag of the two gangs of shovels is seldom the same and varies greatly in amount, and in machines in which the beams are connected to the arches it is obvious that a heavy pull upon one end of the arch not counterbalanced by a corresponding pull on its other end would have a tendency to twist the arches and throw them out of parallelism with the line of advance; but by my method of attaching the beams to the frames at points midway between the arches this twisting tendency is totally avoided and overcome, and light arches may be used, because they serve only to connect the frame-sections together.

Having thus described my invention, what I claim, and desire to secure by Letters Patent of the United States therefor, is—

1. In a walking-cultivator, the combination of two frame members, two arches each pivotally attached to the frame members, a supporting-wheel for each frame member, and two independent cultivator-beams each attached to one of the frame members at a point between the points of attachment of the arches, for the purposes stated.

2. In a walking-cultivator, the combination of two frame members, two arches each pivotally attached to the frame members, a supporting-wheel for each frame member, and two independent cultivator-beams each attached to one of the frame members at a point between the points of attachment of the arches, and means for attaching a draft-animal to each frame member, for the purposes stated.

3. In a walking-cultivator, the combination of two like frame members each having two vertically-arranged bearings, two arches for connecting the frame members having journals on their ends inserted in said bearings, a horizontally-arranged bearing, a cultivator-beam connected with each of said journals, means for attaching a draft-animal to each frame member, and a supporting-wheel on the outer face of each frame member, for the purposes stated.

4. In a machine of the class described, the combination of two independent frame members and two independent arches for connecting the frame members, each arch being composed of two pieces, each piece having at its lower end a journal whereby it is pivotally connected with the frame member and a top piece arranged on a substantially horizontal plane, the top pieces of the two members of each arch overlapping, a plate resting on top of the overlapping ends of each arch and bolts passed through said plates and between the arch members, and a tongue pivotally connected with each plate, for the purposes stated.

5. In a machine of the class described, the combination of two independent frame members, each having two vertically-arranged parts therein in alinement with each other longitudinally of the frame members, two independent arches, each arch comprising two members, each member having a journal at its lower end mounted in a bearing on the frame member and its top portion arranged horizontally and notched at its upper edge, a plate for each arch having its under surface notched and having its front and rear edges arranged to overlap the front and rear edges of the arch members, washers having upturned edges placed beneath the overlapping ends of the arch and bolts passed through the plates and washers and between the arch members whereby the arch members are securely clamped and are capable of longitudinal adjustment relative to each other, and a tongue pivoted to the central portion of each of said plates.

6. In a machine of the class described, having two independent arches, the combination of plates at the top of each arch, a tongue pivotally connected with each plate, the forward one of said plates having openings in its top and hooks pivoted to the tongue to enter the holes in the forward plate whereby the plate is prevented from turning relative to the tongue, and pins for supporting the hooks when not in use.

7. In a machine of the class described, the combination of a frame member having a horizontal tubular extension beveled at its inner end and having a smaller interior diameter at its outer end than through its body portion, a cultivator-beam, a bracket attached to the beam and having an annular rim on its outer face, shaped on its interior to fit with the beveled end of the tubular extension and a journal on the bracket arranged concentrically of the annular rim, said journal projecting through the said tubular extension and engaging the reduced outer end thereof and a pin passed through the projecting outer end of the journal, for the purposes stated.

8. In a machine of the class described, the combination of a cultivator-beam, a bracket bolted to the beam and having a tubular bearing vertically arranged, a plate pivotally connected with the machine-frame to swing in a vertical plane and having near its top a notched lug and near its lower end a perforated lug, a bolt having its upper end bent at right angles and projected horizontally outward through an opening in the plate, resting in the notched lug, extended through the tubular bearing and also through the perforated lug and a nut on the horizontal top portion of the bolt to engage the outer face of the plate, for the purposes stated.

9. In a machine of the class described, the combination of two independent frame members, arches for connecting them, arms to project rearwardly and upwardly from the frame members, a plate pivotally attached to the inner face of each frame member to move in a vertical plane, an arm attached to the lower end of each of said plates to project rearwardly, a cultivator-beam connected with each of said plates to swing in a horizontal plane and a contractile coil-spring for each beam adjustably connected at its lower end with the said arm on the plate and a hook on each cultivator-beam capable of engaging the arm on the machine-frame, for the purposes stated.

10. In a machine of the class described, the combination of two independent frame members and arches for connecting them, a metal loop on the inner forward face of each frame member, a draft-rod adjustably pivoted to each frame member and passed through said loop and a singletree at the forward end of each draft-rod, for the purposes stated.

Des Moines, Iowa, January 13, 1902.

MUCKERSIE G. GRAHAM.

Witnesses:
J. RALPH ORWIG,
W. R. LANE.